(12) United States Patent
Chung

(10) Patent No.: US 8,060,523 B2
(45) Date of Patent: Nov. 15, 2011

(54) SEARCH SYSTEM AND METHOD USING A PLURALITY OF SEARCHING CRITERIA

(75) Inventor: Hyun Joo Chung, Seoul (KR)

(73) Assignee: NHN Corporation, Seongnam-si (KR)

( * ) Notice: Subject to any disclaimer, the term of this patent is extended or adjusted under 35 U.S.C. 154(b) by 1296 days.

(21) Appl. No.: 11/606,747

(22) Filed: Nov. 30, 2006

(65) Prior Publication Data

US 2007/0073667 A1 Mar. 29, 2007

Related U.S. Application Data

(63) Continuation of application No. PCT/KR2005/001383, filed on May 12, 2005.

(30) Foreign Application Priority Data

Jun. 1, 2004 (KR) .................. 10-2004-0039641

(51) Int. Cl.
G06F 13/30 (2006.01)
(52) U.S. Cl. ....................................... 707/767
(58) Field of Classification Search .................. 707/792, 707/682, 723, 767
See application file for complete search history.

(56) References Cited

U.S. PATENT DOCUMENTS

| | | | |
|---|---|---|---|
| 6,363,377 B1 | 3/2002 | Kravets et al. | |
| 6,438,539 B1 | 8/2002 | Korolev et al. | |
| 2002/0103789 A1* | 8/2002 | Turnbull et al. | 707/3 |
| 2002/0103801 A1* | 8/2002 | Lyons | 707/9 |
| 2003/0115251 A1* | 6/2003 | Fredrickson et al. | 709/201 |
| 2008/0208911 A1* | 8/2008 | Lee et al. | 707/104.1 |
| 2010/0094721 A1* | 4/2010 | Kim et al. | 705/26 |

FOREIGN PATENT DOCUMENTS

| | | |
|---|---|---|
| KR | 10-2001-0091506 A | 10/2001 |
| KR | 10-2001-0108877 A | 12/2001 |

OTHER PUBLICATIONS

International Search Report and Written Opinion of ISA dated Aug. 23, 2005 for PCT/KR2005/001383 filed on May 12, 2005.

* cited by examiner

*Primary Examiner* — Diane Mizrahi
(74) *Attorney, Agent, or Firm* — H.C. Park & Associates, PLC

(57) ABSTRACT

Disclosed is a search system using a plurality of search references, and a search method thereof. When a search word is provided by a user terminal through a network, search targets to be searched are established based on the search word. The search process is performed by applying different search references to the respective search targets, and search results are provided to the search targets. According to the present invention, more reliable information is provided.

19 Claims, 9 Drawing Sheets

SEARCH SYSTEM AND METHOD USING A PLURALITY OF SEARCHING CRITERIA

CROSS-REFERENCE TO RELATED APPLICATIONS

This application is a continuation of PCT/KR2005/001383, filed May 12, 2005, which claims the benefit of Korean Patent Application No. 10-2004-0039641 filed Jun. 1, 2004. The disclosures of these prior applications are considered part of, and are incorporated by reference herein, the disclosure of this application.

TECHNICAL FIELD

The present invention relates to a search system and method. More specifically, the present invention relates to a system and method for searching information provided through a network by using a plurality of search criteria.

BACKGROUND OF THE INVENTION

As the Internet has been widely used, Internet-based electronic commerce for people all over the world has been performed, communication between users has also been developed, and various types of communications have been provided on the Internet.

Internet telephones that will substitute for cable telephones have been used in addition to electronic mail and file transmission that are the most basic Internet communication tools, and it is also possible to transmit short messages to a mobile phone on the Internet. Further, a chat system which is an Internet-based multi-user communication system has been provided, and voice chat systems and video chat systems have been developed on the Internet in addition to text chat systems. Communities in which a plurality of users gathers together and communicate documents or opinions for the same topic have been activated.

The community has various items such as cafés, blogs, homepages, clubs, and mini-homepages, and the community shows various contents. In general, respective users who are registered as members of the cafés or clubs post contents or data on a predetermined topic on the notice boards, and users who have opened blogs or mini-homepages post their opinions or data on the bulletin boards.

It is conventionally needed to directly access a community and find contents when the user desires to see or receive the contents posted in the community, and as search techniques have been developed recently, the contents search process based on a search word is performed for respective categories such as web documents, news, images, and dictionaries when the user only inputs the search word corresponding to the desired contents on the web browser, and the search process for the community that has information corresponding to the above-noted search word in the communities such as cafés or blogs is to search the contents that correspond to the search word from among the contents (or data) posted in the communities. Therefore, the user can search for predetermined contents posted in the community without individual access to the community, and know the community that has information related to the search word.

However, many of the contents provided as a result of searching communities have no contents worth referring to since the search process is conventionally performed according to the inclusion status of the search word. That is, in the prior art, when the communities are searched, communities having the input search word are searched, articles including the search word are searched from among the articles of the communities, and sorting menus including the search word are searched from among a plurality of contents sorting menus (e.g., bulletin boards) provided by the communities, and thereby the search process is performed according to the inclusion status of search words.

Accordingly, it is difficult in the prior art to find contents with reliable information for each search process since the search process is performed according to the same condition even though search conditions with different references are required depending on the features of things to be searched, such as a community search, an article search, and a sorting menu search.

[Technical Problem]

It is an advantage of the present invention to search targets with difference references and provide reliable search results for the respective targets.

It is an advantage of the present invention to control the order of arranging the searched targets to be changeable and thereby easily checking reliable information for the search word input by the user.

[Technical Solution]

In one aspect of the present invention, a method for searching information on a search word provided by a user terminal in a system connected to a plurality of user terminals through a network comprises: a) establishing search targets to be searched based on a search word when the search word is provided by a user terminal through the network; b) performing a search process by applying different search references, e.g., criteria, to the respective search targets; and c) providing search results for the respective search targets.

In another aspect of the present invention, in a method for searching information on a search word provided by a user terminal in a system connected to a plurality of user terminals through a network, a method for providing search results comprises: a) searching respective search targets based on a search word when the search word is provided by a user terminal through the network; b) providing a search result to each search target; c) checking the search target selected by the user after provision of search results; d) recording search log 15 information for indicating the search target selected by the user in correspondence to the search word; and e) analyzing the search log information and determining the sorting order of the search targets according to the order of search targets initially selected by the users for the respective search words when the search results are provided, and b) comprises: when the search results are provided, sorting the search targets according to the sorting order following an analysis of search log information of the search word, and providing search results for the respective search targets.

In still another aspect of the present invention, a system being connected to a plurality of users through a network and searching information on a search word provided by the user terminal comprises: a searcher for searching information having a search word when the search word is provided by a user terminal through the network; a reliability estimator for estimating reliability for indicating how reliable information the searched information provides is by applying different search references to information searched for the respective search targets; and a search result provider for providing searched information to the user according to the reliabilities estimated for the respective search targets.

In still yet another aspect of the present invention, a method for searching information on a search word provided by a user terminal in a system connected to a plurality of user terminals through a network comprises: a) establishing search targets to be searched based on a search word when the search word is provided by a user terminal through the network; b) searching information having the search word for each search target; c) generating reliabilities of information searched for the respective search targets by applying different search references; d) determining the order of sorting the search targets according to the search word; and e) sorting the search targets according to the sorting order, sorting information searched for each search target according to the estimated reliabilities, and providing the information to the user.

BEST MODE

Figure 1:
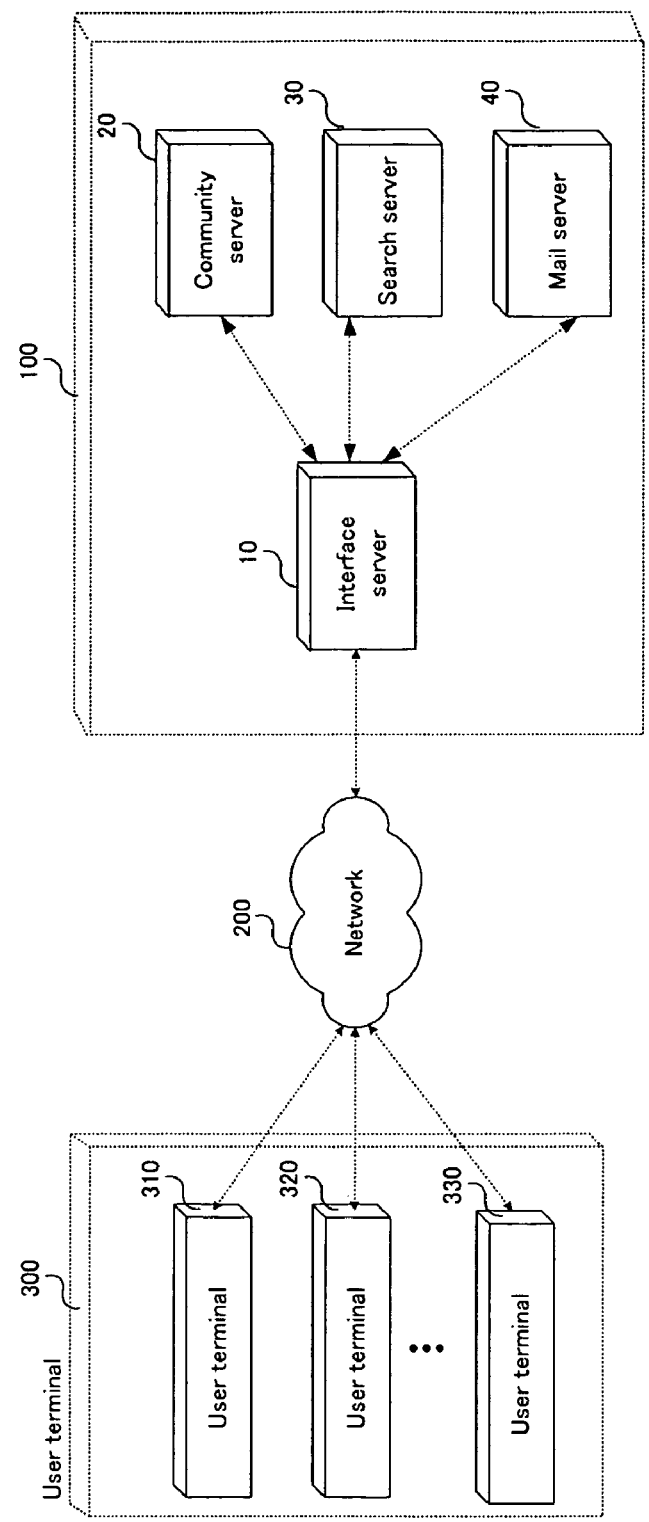
FIG. 1 shows a configuration diagram of a search system on the network according to an embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

The search process for search targets is performed according to different references.

In this instance, the search target indicates information to be searched, and includes a unit, an article, and a sorting menu. The unit represents a community such as a café, a blog, and a talk section for providing contents on a predetermined topic, the article indicates contents posted in the community, and the sorting menu represents categories of different subjects in the community, for example, titles of bulletin boards that classify contents provided by the community, diaries, and photo albums.

Different search references are applied to the respective search targets by considering the above-noted features of search targets in order to provide reliable information. In detail, in the case of searching units, the search process is performed according to a first search reference that considers at least one estimation factor of a community user reliability index, a community activity index, and a community volume. In the case of searching articles, the search process is performed according to a second search reference that considers at least one estimation factor of user features, contents usage, the attached status of additional information, and the size of contents. In the case of sorting menus, the search process is performed according to a third search reference that considers at least one estimation factor of the included status of corresponding sorting menu titles and the number of posted articles.

In particular, the reliability of search targets is estimated according to the respective search references and search results are provided according to the estimated reliability so that more reliable information is provided.

Estimation factors considered by the first search reference will now be described.

The community user reliability index considered in the first search reference represents a sum of reliability indexes of all users registered to the corresponding community, and each reliability index shows the reliability of the information the corresponding user provides. The user's reliability indexes may be estimated according to the user's network activity. For example, the network activity may represent a reply to a question provided by another person in a knowledge share service on the Internet, and in this instance, the user's reliability index may be generated depending on the status in which how many replies are given to the question and how many provided replies are selected (e.g., a reply selection rate). Also, the network activity includes all activities for providing information on the network in addition to the knowledge share service, and the user's reliability index may include a sum of compensation means (e.g., mileage points) provided from a system according to the activity result.

Further, the community user reliability index may be a value estimated according to the contents usage degree by other users. For example, the first user's reliability index is estimated according to the value (e.g., the number of scrapped times) for indicating how many times the contents posted by the first user are scrapped, and the community user reliability index may be generated according to the sum of first users' reliability indexes.

Also, the community activity index considered in the first search reference indicates how may contents the community provides and receives, and may be generated according to the sum of activity indexes of community members, the number of visitors, and the number of generated relationships. For example, the community activity represents an activity for a user to post contents in the community, and the user's activity index may be varied depending on how many new contents the user posts for a predetermined time (e.g., a recent time with respect to the present). Also, the community activity index may be varied according to the number of users visiting the corresponding community, which is based on the fact that the number of other users visiting the community to which the user belongs may be increased when the community users provide more useful and reliable contents.

Further, the community activity index may be varied depending on the number of other communities having a predetermined relationship with the corresponding community in the case of personal communities. In general, another blog (a second blog) may form a predetermined relationship that is a neighbor with a predetermined blog (a first blog) in a like manner of a "neighbor blog" in the personal community such as a blog. When the neighbor blog relationship is formed, a link for an access to the first blog is displayed on the second blog, and hence the users accessing the second blog may easily access the first blog without any additional search process. The community activity index may be varied according to the number of other communities (the number of generated relationships) having a relationship since the users tend to have a relationship with more useful and reliable blogs.

The above-described community activity index may be varied according to at least one factor of the sum of activity indexes of members, the number of users visiting the corresponding community (the number of visitors), and the number of generated relationships, and it is not restricted to the described factors.

Also, the community volume considered in the first search reference may be varied according to the number of users registered to the community and the number of contents posted in the community.

In the embodiment, in the case of performing a search process in consideration of the first search reference, at least one of the community user reliability index, the community activity index, and the community volume is considered, and the reliability of the corresponding community is estimated. However, it is undesirable to estimate the reliability based on the community volume, and it is rather desirable to estimate the reliability by including at least one of the community user reliability index and the community activity index.

Estimation factors considered in the second search reference will now be described.

The features of the user posting the contents considered in the second search reference indicate an age, a job, a residence area, and a reliability index, and are used for dividing the reliability of contents based on the statistical result showing that users over a predetermined age or professional users post more reliable information. Therefore, it is previously required to sort contents according to the users' ages, jobs, or residence areas, estimate reliabilities of information included in the sorted contents, and determine users of what age or job provide more reliable information.

The user reliability index is a value given when the system estimates how reliable information each user posts is. The user reliability index may be a value that is estimated according to the usage of contents by other users. For example, the reliability of the first user may be estimated based on the value (e.g., the scrapped number) for showing how many times second users scrap the contents posted by the first user or the value (e.g., the number of connection as neighbors) for indicating how many second users have a predetermined relationship with the first user's community. Also, the user reliability index may be a value estimated according to the user's network activity. For example, the network activity may represent a case of replying to a question provided by a user on the Internet in the knowledge share service, and in this instance, the user reliability is generated by how many replies are provided to the questions and how many provided replies are selected (i.e., a reply selection rate).

Contents usage considered in the second search reference indicates how many corresponding contents other users refer to and use. Factors for estimating the number of times of referring to and using the contents include the number of times of recommending contents to other users (the number of recommendations), the number of posting replies to contents by other users (the number of replies), and the number of posting comments to contents by other users (the number of comments), and further include the number of mailing contents (the number of mailing), the number of recommending contents to other users (the number of recommendations), and the number of outputting contents (e.g., printouts) (the number of outputs). In this instance, the comments indicate replies that the user may provide while reading the articles, and can be referred to by various names (e.g., a tail comment, a comment, or a single line reply) by service providers. Also, the factor may include the number of scrapping contents by the user (the scrapped number). The scrapping on the network represents providing (copying) part of or all the contents posted on the network to a predetermined position. In addition, the factor may include the number of executing all events that can be generated when a user clicks contents.

Further, status of attaching additional information to contents considered in the second search reference indicates whether additional information attached status such as images, moving pictures, and audio is provided to the contents in addition to text information.

Also, the size of contents considered in the second search reference is given in bytes and indicates how much information the contents have, based on the fact that more information is included in the contents as the size of contents is increased.

In the embodiment, in the case of performing a search in consideration of the second search reference, at least one of estimation factors including the above-noted user features, the contents usage, the status of additional information attachment, and the size of contents is considered to perform a search process and estimate the reliability of corresponding articles.

Estimation factors considered in the third search reference include the search word included status of corresponding sorting menu titles and the number of articles, and may also include the contents usage of the estimation factors considered in the second search reference.

Other embodiments may include other estimation factors in the respective search references.

Also, the present invention applies different search references to the units, articles, and search targets for respective menus, and it is possible to apply different references to a single search target. For example, the first search reference or the second search reference may be applied according to community types in the case of searching units. That is, the search process is performed according to the first search reference in the case of searching shared communities such as cafés, and the search process is performed according to the second search reference in the case of searching personal communities such as blogs.

The communities searched according to the estimation factors include any types of communities that may be generated on the network, for example, shared communities (e.g., cafés or clubs) in which a plurality of users are registered as members and share data or opinions for the same topic, and personal communities (blogs, personal homepages, mini homepages, and profiles) in which each person manages his community and posts contents such as his data or opinions.

The contents according to the present invention include contents belonging to all categories (e.g., web documents, news, and dictionaries) provided on the network in addition to the articles posted in the shared or personal community.

A detailed configuration and operation of a search system on the network according to the embodiment of the present invention will now be described.

Figure 2:
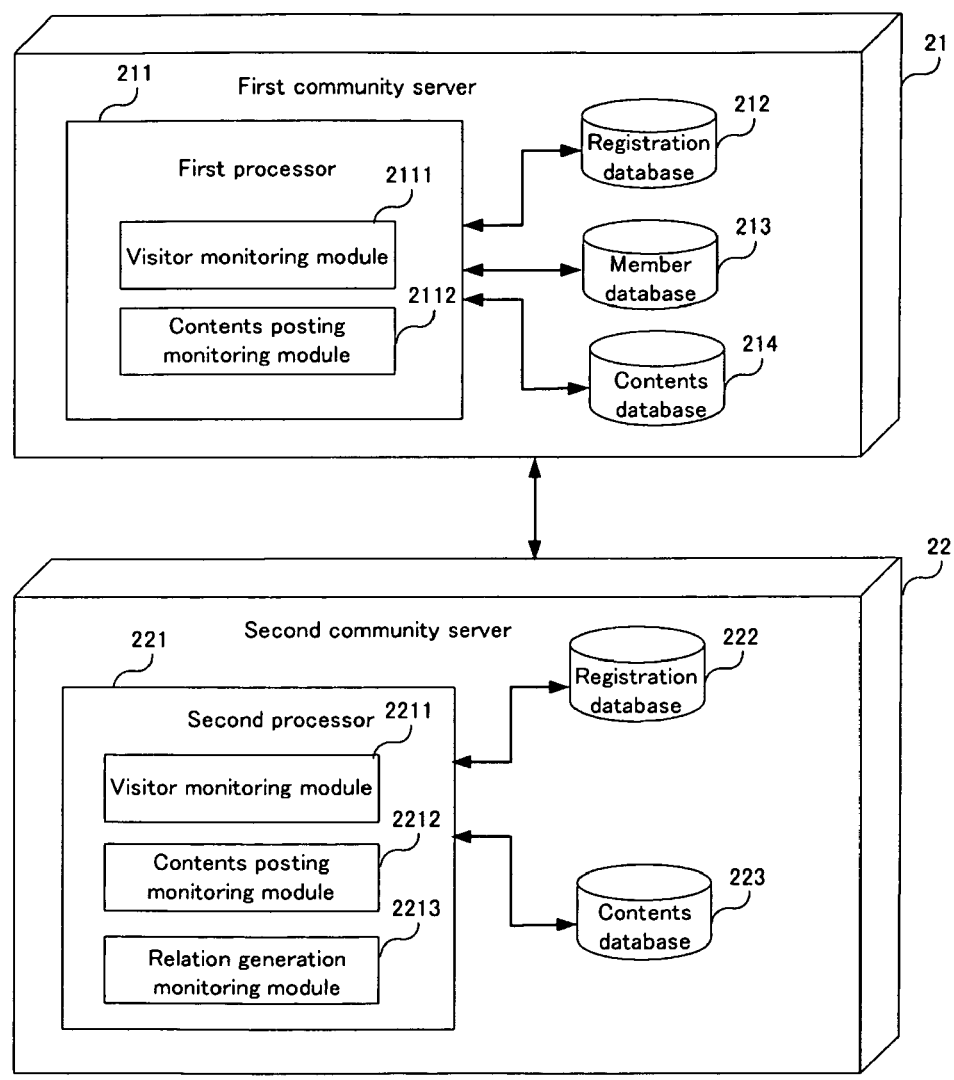
FIG. 2 to FIG. 4 show detailed configuration diagrams of respective servers forming the search system shown in FIG. 1.
Figure 3:
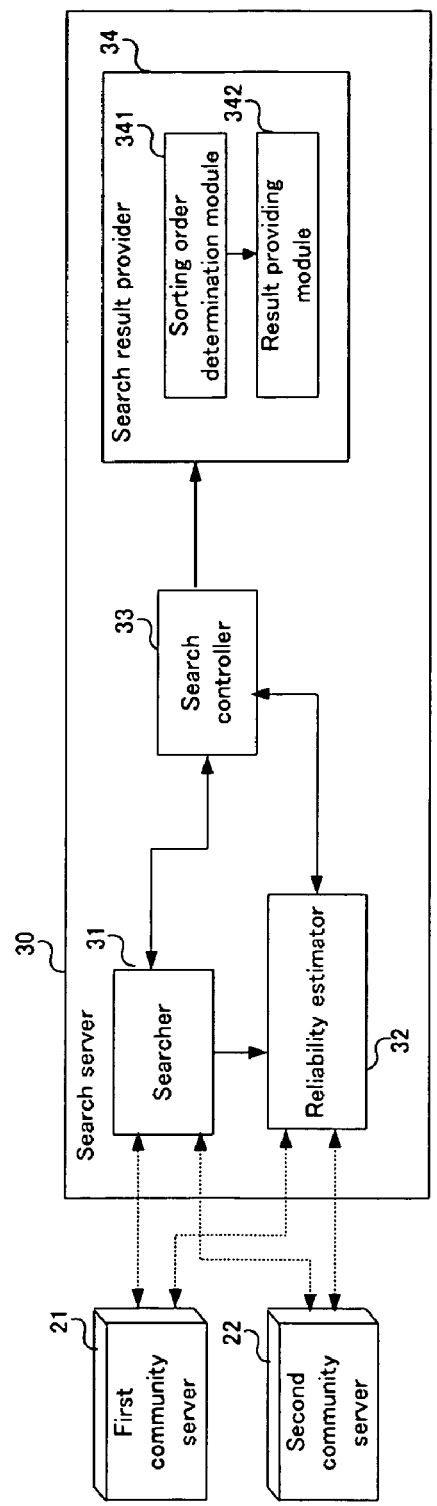

FIG. 1 shows the search system on the network according to the embodiment, and FIG. 2 and FIG. 3 respectively show a detailed configuration of a server.

The search system 100 provides a search service to users through the Internet or wireless communication networks. As shown in FIG. 1, the search system 100 is connected to a plurality of user terminals 310, 320, 330, . . . (referred to as 300 for ease of description) through a network 200 (various types of networks including a telephone network, the Internet, and a wireless communication network).

The user terminal 300 is a communication device for accessing the search system 100 through the network 200, and includes a cable telephone, a mobile terminal, a computer, and an Internet TV. Therefore, the user can easily and quickly access the search system 100 by using PC communication, the Internet, the wireless Internet, or the telephone network.

The system 100 connected to the user terminal 300 and providing a search service to a plurality of users includes an interface server 10, a community server 20, and a search server 30.

The interface server 10 controls a plurality of terminals 300 to access the system 100 through the network 200, in particular, the Internet or the wireless Internet, converts various categories of information provided through the servers 20 and 30 according to a communication standard and provides converted information to the terminals 300 through the network 200, or receives information from the terminal 300 through the network 200 and provides the information to the servers 20 and 30 thereby functioning as a WEB server or a WAP server.

The community server 20 for providing a community service includes a first community server 21 for providing and managing a shared community, and a second community server 22 for providing and managing a personal community as shown in FIG. 2. The respective community servers 21 and 22 include a database for storing information on the community, and a processor for generating and managing a community between users based on the information stored in the database.

In detail, the first community server 21 includes a first processor 211 for forming a shared community and managing contents, a registration database 212 for storing outlined information for indicating what features the shared communities have for the respective formed shared communities, a member database 213 for storing information on the users registered as members to the respective shared communities, and a contents database 214 for storing contents for the respective shared communities.

The registration database 212 stores outlined information on the shared communities registered for categories, for example, the registration database 212 stores ID codes of shared communities registered for the respective category codes given according to the categories including broadcasting, entertainment, economics, and politics. It also stores community information including a shared community name, a description on features, shared community manager information (an ID or a nickname), the number of members, and a registration date for each shared community ID code, and it also stores information on the number of visitors who have visited the corresponding community for a predetermined period (e.g., a recent time).

The member database 213 stores information (i.e., member information) on the users who are members of registered shared communities. For example, it stores member information including IDs, nicknames, passwords, ages, sex, occupations, and mail addresses of the users who are registered as members corresponding to the shared community ID codes, and also stores reliability indexes of the respective users.

The contents database 214 stores information on the contents provided for the respective corresponding shared communities. For example, the contents database 214 stores information including contents posted numbers, contents provider IDs, contents posted dates, contents titles, and contents descriptions corresponding to the shared community ID codes. It stores the number of replies, the number of added comments, the number of mailings, and the number of recommendations for the respective contents, and also stores the number of contents (i.e., the number of recent contents) posted for a predetermined period (e.g., a recent time) for each shared community. The contents information may be stored according to sorting menus generated in the respective shared communities. For example, the contents information is stored as described according to sorting menus such as a bulletin board of a predetermined shared community, and a diary.

The first processor 211 generates and manages shared communities based on the databases 212 to 214 storing the above-described information. In detail, the first processor 211 generates and registers shared communities, authenticates users for the respective shared communities, and posts and manages contents for the respective shared communities. In particular, the first processor 211 includes a visitor monitoring module 2111 for counting the number of visitors (accessing users except the users who are registered as members to a predetermined shared community) who access the corresponding shared community, and a contents posting monitoring module 2112 for checking contents posting by the users registered as members to a predetermined shared community and counting the number of recent contents for each contents posting.

The second community server 22 is a server for providing a personal community to each user and managing the same, and it may also be referred to as a "blog server." As shown in FIG. 2, the second community server 22 includes a second processor 221 for generating personal communities and managing contents, a registration database 222 for storing information on the personal communities, and a contents database 223 for storing contents posted by the users for the respective personal communities.

The registration database 222 stores outlined information on the personal communities registered for respective categories. For example, the registration database 222 stores ID codes of personal communities registered for categories, and community information including personal community titles for the respective personal community ID codes, IDs or nicknames of users who have personal communities, reliability indexes of the users, and registration dates, and also stores information on the number of visitors who have visited the corresponding communities for a predetermined time (e.g., a recent time) and the number of generated relationships of communities for the respective personal communities.

The contents database 223 stores information on the contents provided for the respective personal communities. For example, the contents database 223 stores information including contents posted numbers, contents posted dates, contents titles, and contents descriptions corresponding to the personal community ID codes. It stores the number of replies, the number of added comments, the number of mailings, and the number of recommendations for the respective contents, and also stores the number of recent contents (i.e., a recent time) posted for a predetermined period (e.g., a recent time) for each personal community, and activity indexes of corresponding users that can be generated based on the number of recent contents. The contents information may be stored according to sorting menus generated in the respective personal communities. For example, the contents information is stored as described according to sorting menus such as a diary of a predetermined public community, and a visitor's book.

The second processor 221 generates and manages personal communities, and posts and manages contents for respective personal communities. Also, the second processor 221 includes a visitor monitoring module 2211 for counting the number of visitors (accessing users except the users who are registered as members to a predetermined shared community) who access the corresponding shared community, and a contents posting monitoring module 2212 for checking contents posting by the corresponding users for each personal community and counting the number of recent contents for each contents posting. The second processor 221 further includes a relationship generation monitoring module 2213 for counting the number of generated relationships according to visitors' requesting generation of predetermined relationships with corresponding personal communities. It is described in the embodiment that the second processor 221 for managing personal communities includes a relationship generation monitoring module 2213, and without being restricted to this, the first processor 211 for managing the shared communities may further include a module for performing the same function as that of the relationship generation monitoring module.

In the embodiment, modules for monitoring posting contents to corresponding communities, visitors' accesses, and generation of relationships are generated in the first and second community servers 21 and 22, and the monitoring modules 2111, 2112, 2211, 2212, and 2213 may be separated from the community servers 21 and 22.

The above-configured processors 211 and 221 increase the number of replies or comments of the corresponding contents when another user (who has not posted the contents) adds a reply or a comment to the contents.

Further, the first and second community servers 21 and 22 may share contents in cooperation with each other. For example, a user may request to post the contents posted in a shared community into the user's own personal community by using a menu such as "Deliver Contents," and in this instance, the first processor 211 of the first community server 21 copies corresponding contents and transmits the same to the second community server 22, and the second processor 221 of the second community server 22 posts the contents in the user's personal community. In this instance, the second processor 221 may show the source of the contents when posting the contents in the personal community.

As shown in FIG. 3, a search server 30 for searching communities according to a search word provided by a user terminal 300 includes a searcher 31 for searching for communities having the search word, a reliability estimator 32 for estimating reliabilities of searched communities, a search controller 33 for controlling operations of the searcher 31 and the reliability estimator 32, and a search result provider 34 for providing searched contents to the user according to the estimated reliabilities.

The searcher 31 searches for search targets having information corresponding to the search word. The searcher 31 includes a first searcher 311 for searching communities that have a topic having a word corresponding to the search word or have a word corresponding to the search word, a second searcher 312 for searching articles including the search word, and a third searcher 313 for searching sorting menus including a topic having the search word or an article.

The reliability estimator 32 estimates reliabilities of the search targets searched by the searcher 31. In this instance, the reliability estimator 32 includes a first reliability estimator 321 for estimating reliability on a search target according to a first search reference, a second reliability estimator 322 for estimating reliability on a search target according to a second search reference, and a third reliability estimator 323 for estimating reliability on a search target according to a third search reference.

Figure 4:
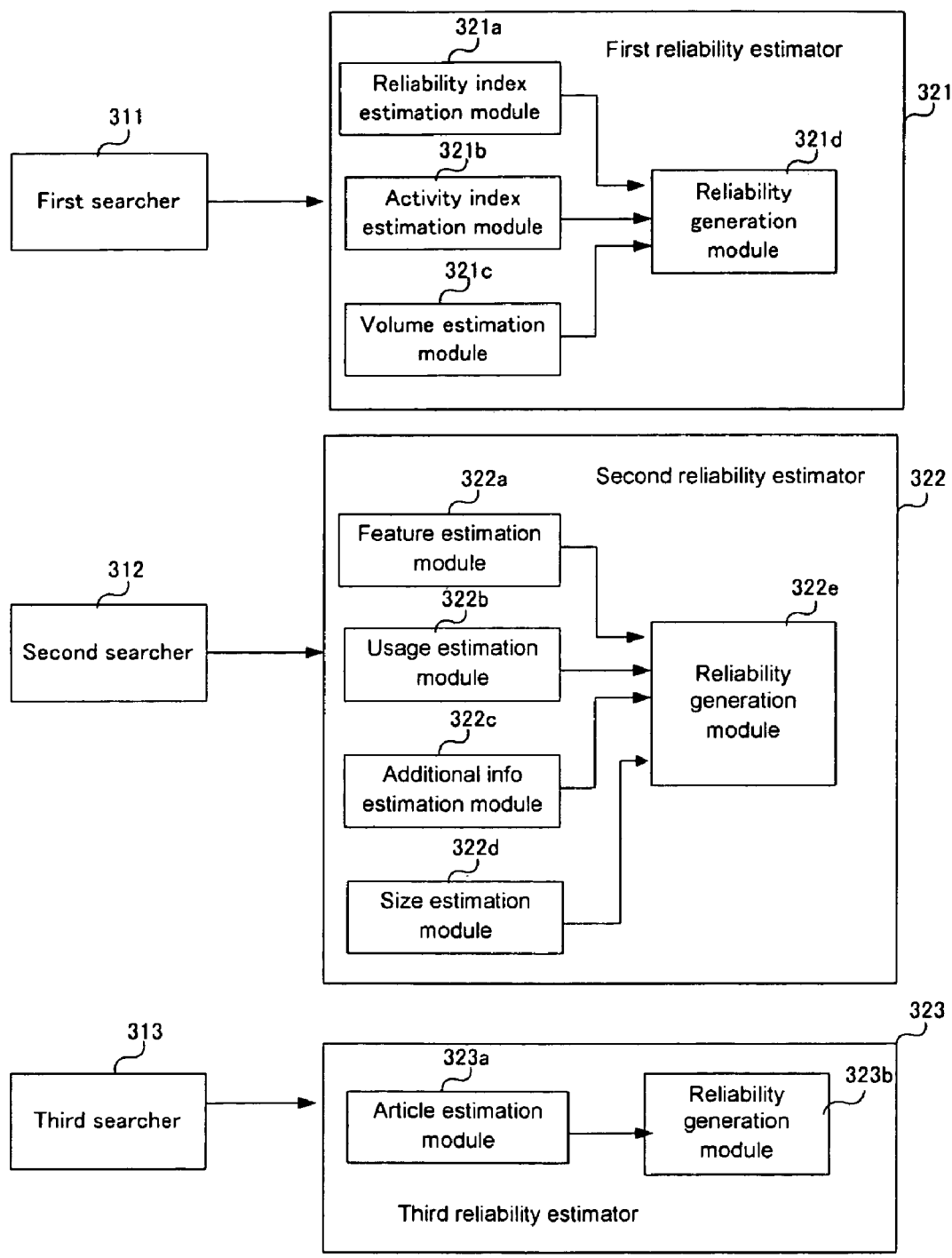

FIG. 4 shows a configuration of the respective reliability estimators 321 to 323.

The first reliability estimator 321 includes a reliability index estimation module 321a for estimating community user reliability indexes, an activity index estimation module 321b for estimating community activity indexes, a volume estimation module 321c for estimating community volumes, and a reliability generation module 321d for estimating reliabilities of corresponding communities based on the results of the respective estimation modules 321a to 321c.

Also, the second reliability estimator 322 includes a feature estimation module 322a for estimating features of a user posting contents, a usage estimation module 322b for estimating usage of contents, an additional information estimation module 322c for estimating the additional information attached status of contents, a size estimation module 322d for estimating the volume of contents, and a reliability generation module 322e for estimating reliabilities of corresponding contents based on the results of the respective estimation modules 322a to 322d.

The third reliability estimator 323 includes an article estimation module 323a for estimating the number of articles of the respective sorting menus, and a reliability generation module 323d for estimating reliabilities of corresponding contents based on the article estimation results.

In this instance, the estimation modules of the respective reliability estimators 321 to 323 may be varied according to the factors used for reliability estimation.

The search controller 33 operates the searcher and the reliability estimator to perform a community search, and in particular, operates a corresponding searcher and a reliability estimator according to the search target, and also selectively drives respective estimation modules of respective reliability estimators according to the established reliability generation factors. For example, the search controller 33 drives the first searcher 311 and the first reliability estimator 321 when the search target is a unit, and the search controller 33 drives the estimation modules 321a to 321c of the first reliability estimator 321 when the above-exemplified three factors (the community user reliability index, the community activity index, and the community volume) as factors considered as the first search reference, and the search controller 33 drives a corresponding estimation module to perform reliability estimation when one of the three factors is established as an estimation factor. This selective drive is identically applied to all the searchers and the reliability estimators.

The searched targets and reliability information for each search target are transmitted to the search result provider 34.

The search result provider 34 sorts the communities provided by the search controller 33 according to reliabilities, and provides the sorted communities to the user, and includes a sorting order determination module 341 and a result providing module 342, as shown in FIG. 3.

The sorting order determination module 341 provides the result providing module 342 with at least one ordering information of first ordering information that corresponds to the order established when the system 100 provides the search result, second ordering information that corresponds to the order established according to the user's selection, and third ordering information that corresponds to the order established according to the feature of the search word. The result providing module 342 sorts search results of respective search targets according to the provided ordering information to generate a search result page, and provides the search result page to the user terminal 300.

Therefore, the search results may be exemplarily provided in the order of the unit, the articles, and the sorting menu or in the order of the article, the unit, and the sorting menu on the search result page.

In this instance, according to the embodiment of the present invention, the search results are sorted and provided in the order from the highest reliability to the lowest reliability of the search targets, or the search results with reliabilities greater than a predetermined value are selected and provided.

In the embodiment, the first and second community servers 21 and 22 are realized in a single system, and they may be separately realized in different systems. For example, a first system may include the first community server to provide a shared community service, and a second system may include the second community server to provide a personal community service. Also, the database and the processor 221 in the respective servers 21 and 22 may be realized as independent servers to process corresponding functions, and the databases may be combined in a single server. For ease of description, the databases are classified as described above, and other embodiments have different classifications of the databases.

A search method on the network according to the embodiment will now be described based on the above-described configuration.

Figure 5:
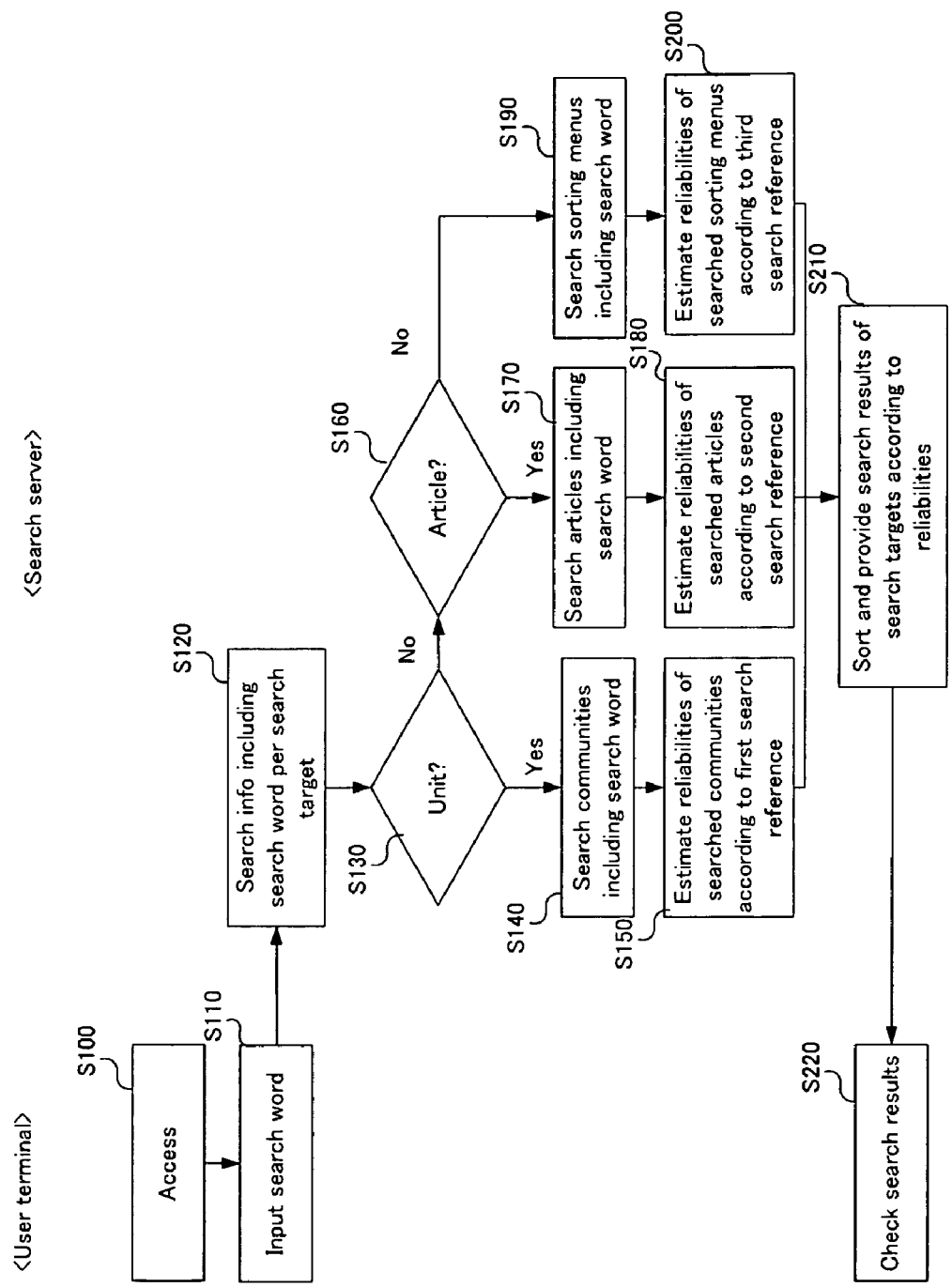
FIG. 5 shows a flowchart of a search method according to an embodiment of the present invention.

FIG. 5 shows a total flowchart of the search method.

As shown, a plurality of users execute a user program provided by the interface server 10 to directly access the search server 30 or directly access the interface server 10 through a web browser to input a search word corresponding to contents to be searched, in order to search for desired contents by using a terminal 300. In this instance, the user may access the initial web page of the system through the interface server 10, access a predetermined web page for providing a community service, and input a search word on a community service web page. For example, the user may access the system 100 to access a shared community service providing page and input a search word, or access a personal community service providing page and input a search word in steps S100 and S110.

The search word input by the user is transmitted to the search server 30 and the search server 30 then searches communities based on the input search word.

First, the search server 30 finds information having the input search word for respective search targets in step S120.

In detail, the search server 30 finds units, that is communities, having information including the search word from among units. The search server 30 searches contents databases 214 and 223 of the first and/or second community servers 21 and/or 22 to search for communities having contents with information that corresponds to the input search word, or searches the registration databases 212 and 222 of the respective community servers 21 and 22 to find communities having descriptions having the word that corresponds to the search word from among community descriptions in steps S130 and S140.

Next, reliabilities of searched communities are estimated according to estimation factors established to be considered in the first search reference. That is, the reliabilities of communities are estimated by considering at least one estimation factor of the community user reliability index, the community activity index, and the community volume in step S150.

Also, the search server 30 finds articles that have information including the search word from among the articles. That is, the search server 30 finds articles with information that corresponds to the input search word from among the articles stored in the contents databases 214 and 223 of the first and second community servers 21 and 22 in step S120. In general, since each of the articles posted in the community has a title and contents, the search server 30 refers to the titles and contents of the articles to determine whether information corresponding to the search word is provided, and performs a search process in steps S160 and S170.

Next, the search server 30 estimates reliabilities of the searched articles according to the estimation factors established to be considered in the second search reference. That is, the search server 30 generates the reliabilities of the articles in consideration of at least one estimation factor of the user features, contents usage, additional information attachment status, and contents size in step S180.

Further, the search server 30 finds sorting menus having information including the search word from among sorting menus of respective communities in step S190. That is, the search server finds articles with information that corresponds to the input search word from among the articles stored in the contents databases 214 and 223 of the first and second community servers 21 and 22, and checks the sorting menus posting the corresponding articles.

Next, the search server estimates reliabilities of articles of the searched sorting menus according to the estimation factors established to be considered in the third search reference. That is, the search server considers at least one of estimation factors including the number of articles and generates the reliability of the sorting menu in step S200.

When the reliability is generated as described above, the searched communities are arranged and provided to the user according to the generated reliability in steps S210 and S220. In this instance, the search server 30 arranges the respective search targets according to the established search arrangement order, and provides search results of respective search targets. For example, when the arrangement order in the system is given as the unit, the article, and the sorting menu, the search result of units is initially displayed on the search result page, the search result of articles is then displayed, and the search result of sorting menus is finally displayed. The search result arrangement order is variable. The search results may be displayed in an orderly manner according to the estimated reliabilities, they may be randomly displayed, or those having reliabilities greater than predetermined reliability may be selectively displayed.

The search stage of S120 to S200 in the search process according to the embodiment will now be described in further detail.

Figure 6:
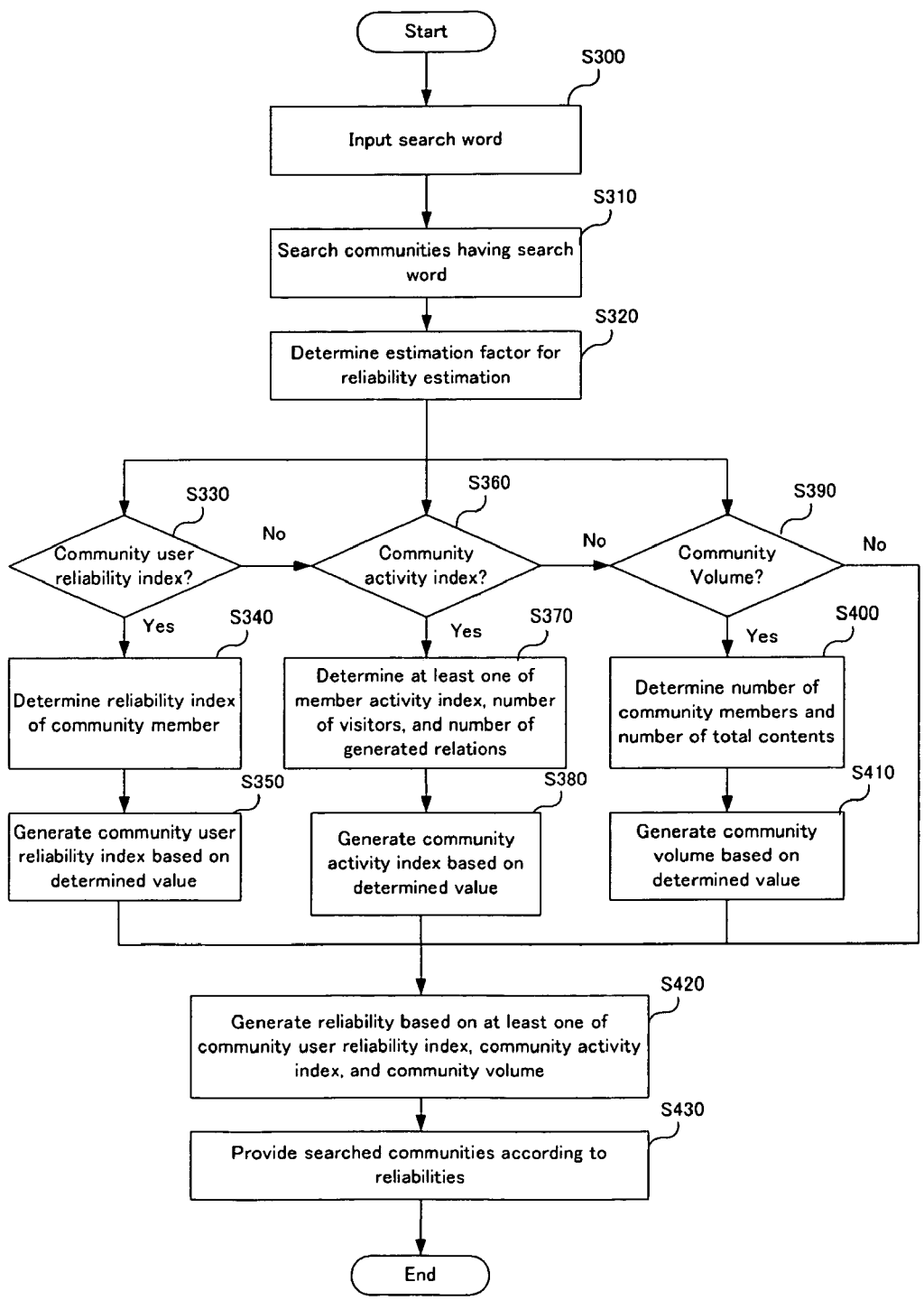
FIG. 6 shows a detailed flowchart of a unit search method in the search process shown in FIG. 5.

FIG. 6 shows a detailed flowchart of a unit search method in the search process.

As shown, when a search word is provided, the search controller 33 of the search server 30 drives the first searcher 311 to search for communities having information on the search word. The first searcher 311 searches the contents databases 214 and 223 of the respective community servers 21 and 22 to find the communities having the contents including the search word, or searches the registration databases 212 and 222 of the community servers 21 and 22 to find communities having community descriptions or titles having the search word in steps S300 to S320. In this instance, the searcher 31 may selectively search the communities according to word frequencies for showing how many words corresponding to the search word are included or the matched status with the corresponding search word.

When the communities having information corresponding to the input search word are searched, the search controller 33 selectively drives the estimation modules 321a to 321c of the first reliability estimator 321 according to the established estimation factors. For example, the search controller 33 drives the reliability index estimation module 321a when the community user reliability index is established as an estimation factor to be considered for reliability estimation, and the search controller 33 drives the activity index estimation module 321b when the community activity index is established as an estimation factor. In addition, the search controller 33 respectively drives at least two corresponding estimation modules when a plurality of estimation factors are established. In this instance, the corresponding estimation modules are concurrently driven to perform estimation or the same are sequentially driven to perform sequential estimation.

The respective estimation modules 321a to 321c of the first reliability estimator 321 find values corresponding to estimation factors.

In detail, the reliability index estimation module 321a searches the member database 213 of the first community server 21 based on the ID of the shared community, finds reliability indexes of respective users registered as members to the shared community, sums the reliability indexes of the users, and generates a community user reliability index when the search community is a shared community. The first reliability index estimation module 321 searches the registration database 222 of the second community server 22, finds the reliability index of the user who has generated the personal community, and establishes the reliability index as a community user reliability index when the search community is a personal community in steps S330 to S350.

The activity index estimation module 321b finds the number of recent contents, the number of recent visitors, and the number of generated relationships for the respective searched communities, and estimates activity indexes based on the found values. For example, when the searched community is a shared community, the activity index estimation module 321b searches the registration database 212 of the first community server 21 to find the number of recent visitors based on the IDs of the shared community, searches the member database 213 to find the activity indexes of community members, and generates the community activity index by the operation of summing the activity indexes of members and summing the number of recent visitors. Also, when the searched community is a personal community, the activity index estimation module 321b searches the registration database 222 of the second community server 22 to find the number of recent visitors and the number of generated relationships, searches the contents database 223 to find the activity indexes of the corresponding community manager, and generates the community activity index by the operation of summing the found activity index, the number of recent visitors, and the number of generated relationships in steps S360 to S380.

The volume estimation module 321c searches the registration databases 212 and 222 and the contents databases 214 and 223 of corresponding community servers for the respective searched communities, finds the total number of members and the total number of contents of the corresponding community, and generates the community volume based on the found values in steps S390 to S410.

As described, the values estimated by the estimation modules 321a to 321c of the first reliability estimator 321 are provided to the reliability generation module 321d, and the reliability generation module 321d generates the reliabilities of the searched communities in step S420 based on the values corresponding to the established estimation factors. That is, the reliability generation module 321d generates the reliabilities of the communities by considering at least one estimation value corresponding to the community user reliability index, the community activity index, and the community volume according to the three estimation factors. For example, the community reliabilities are generated by summing the values of the community user reliability index, the community activity index, and the community volume.

As described above, information on the communities searched by the first searcher 311 and the reliabilities of respective communities estimated by the first reliability estimator 321 are transmitted to the search result provider 34.

The result providing module 342 of the search result provider 34 selects the communities with a reliability greater than a predetermined value based on the reliabilities of the searched respective communities, generates a search result page and provides the page to the user, or sorts the communities in the order from the highest reliability to the lowest reliability, and generates a search result page and provides the page to the user in step S430. In addition, the search result provider 34 may generate the search result page by randomly sorting the searched communities. Link information (e.g., community homepages) for a direct access to other communities is displayed together with the titles of corresponding communities on the search result page, and further information on community descriptions, manager nicknames (or IDs), the number of members, generated dates, and directories to which the communities belong.

When the contents having information corresponding to the input search word are searched in the above-described community search process, search results on the searched contents may be provided in addition to providing information on the communities as described above. That is, link information for a direct access to the searched contents is displayed based on the contents titles on the search result page, and a part of contents and the titles of communities in which corresponding contents are posted may be displayed. In this instance, the contents search results may be sorted according to the reliabilities of respective communities according to the described embodiment, or the contents posted in the communities with reliability greater than an established value may be selectively displayed.

An article search process in the search stage shown in FIG. 5 will now be described in detail.

Figure 7:
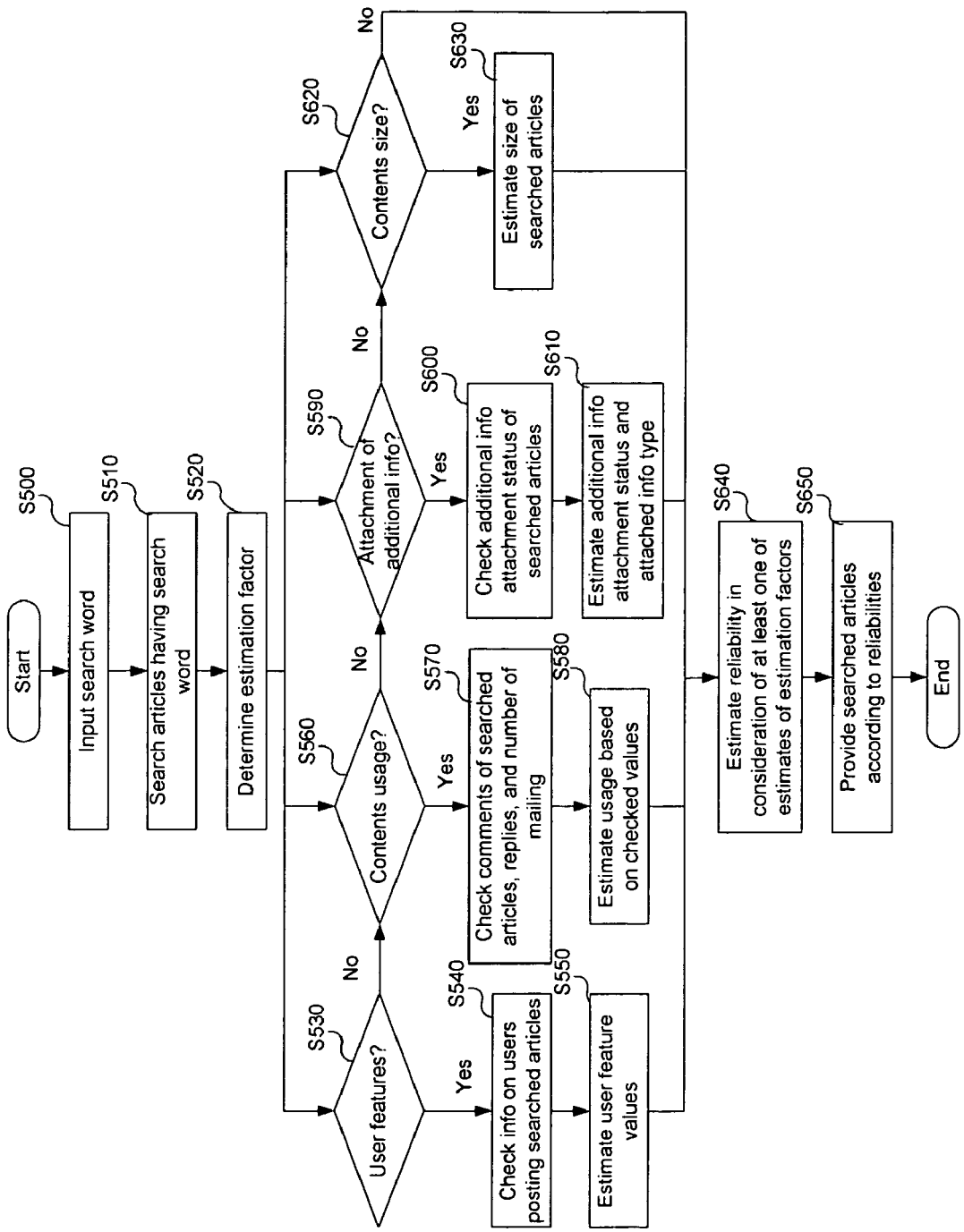
FIG. 7 shows a detailed flowchart of a posted article search method in the search process shown in FIG. 5.

FIG. 7 shows a detailed article search process.

As shown, when a search word is provided, the search controller 33 of the search server 30 drives the second searcher 312 to search for contents including information that corresponds to the search word. The second searcher 312 searches the contents databases 214 and 223 of the respective community servers 21 and 22 to find contents including the search word, and then transmits the contents to the reliability estimator 32 in steps S500 and S510. In this instance, the second searcher 312 may selectively search the contents depending on the word frequency that shows how many words that correspond to the search word the contents have, or the correspondence status with the corresponding search word.

Next, the search controller 33 selectively drives the estimation modules 322a to 322d of the second reliability estimator 322 according to the established estimation factors in step S320. For example, the search controller 33 drives the feature estimation module 322a when the user feature is established as an estimation factor to be considered, the search controller 33 drives the usage estimation module 322b when the contents usage is established as an estimation factor, the search controller 33 drives the additional information estimation module 322c when the additional information attachment status is established as an estimation factor, and the search controller 33 drives the size estimation module 322d when the contents size is established as an estimation factor. In addition, the search controller 33 drives at least two corresponding modules when at least two estimation factors are established. When at least two estimation factors are established as described, the search controller 33 concurrently drives the corresponding modules to perform a search process or sequentially drives the modules to perform a sequential search process.

The respective estimation modules 322a to 322d of the second reliability estimator 322 find estimates corresponding to estimation factors.

In detail, the feature estimation module 322a searches the member database 213 and/or the registration database 222 to estimate the users' ages based on the IDs of users posting the contents searched by the second searcher 312 in steps S530 to S550 when the user feature is established as an estimation factor and an age is established from among user features. Also, the feature estimation module 322a searches the member database 213 and/or the registration database 222 to determine the user's job when the job is established from among the user feature.

Further, when the user reliability index is established from among the user features, the feature estimation module 322a finds the contents posted by a predetermined user from the contents databases 214 and 223 of the respective community servers 21 and 22 and estimates the user's reliability index based on the scrapped number of respective contents, or estimates the number of other users who have a predetermined relationship with the community registered or generated by the user, that is, the number of connections as neighbors from the registration databases 212 and 222 of respective community servers and estimates the user's reliability index based on the estimated number. The user's reliability index may be estimated by other various methods in addition to the above-noted method.

When the contents usage is established as an estimation factor, the usage estimation module 322b refers to the contents databases 214 and 223 and estimates the usage based on the number of replies, and/or the number of comments, and/or the number of mailing which are stored corresponding to the searched contents in steps S560 to S580.

Also, when the additional information attachment status is established as an estimation factor, the additional information estimation module 322c searches the contents databases 214 and 223 of the community servers 21 and 22 to find contents having the search word, checks whether the found contents have additional information such as images, moving pictures, and audio in addition to text information, and determines the type of attached additional information in steps S590 to S610.

Further, when the contents size is established as an estimation factor, the size estimation module 322d searches the contents databases 214 and 223 of the community servers 21 and 22 to find contents having the search word, and estimates the sizes of found contents (e.g., the number of bytes) in steps S620 to S640.

The values estimated by the respective estimation modules 322a to 322d of the second reliability estimator 322 are provided to the reliability generation module 322e and the reliability generation module 322e respectively generates reliabilities of the contents searched based on the estimates corresponding to the established estimation factors in step S650. That is, the reliability generation module 322e generates the reliabilities of contents based on the estimate that corresponds to at least one estimation factor of the user feature, contents usage, additional information attachment status, and contents size.

Various methods for generating the reliability may be used. In the embodiment, the reliability generation function is established, and the reliability generation function generates the reliability of contents based on the weight of a predetermined input value according to the estimate for each estimation factor. In this instance, the input value provided as the reliability generation function may include an estimate per estimation factor.

In particular in the embodiment, a plurality of established ranges having representative values for respective estimation factors are provided, and the representative value of an established range to which the estimate for each estimation factor belongs is established to be an input value of the reliability generation function. For example, when the estimation factor is given with the user feature and in particular the age, the value of "10" may be given as the representative value for the teenagers, the value of "50" may be given as the representative value for the persons in the twenties, and the value of "100" may be given as the representative value for the persons in the thirties. In this instance, the input value is established to be "50" when the age of the estimated user belongs to the twenties.

When the contents size is established as an estimation factor, a representative value may be provided proportionally from among the contents the size of which is greater than an established value and is given within the maximum. For example, when the maximum size of contents to be written is established to be 500 bytes, the highest representative value is provided to the contents having the size equal to 500 bytes, and a lowered representative value is provided to the contents having the size greater than 500 bytes, which considers the case in which the contents of a very large volume may include further undesired information.

The weights are provided based on the above-established input values for respective estimation factors, and the reliabilities of corresponding contents are generated through the reliability generation function based on the weights. However, the reliability generation method may have other embodiments including another method for generating the reliability by summing the estimates for respective estimation factors.

Next, the reliabilities of respective contents estimated by the second reliability estimator 322 together with the contents searched by the second searcher 312 are transmitted to the search result provider 34.

The search result provider 34 selects contents having reliabilities greater than a predetermined value based on the reliabilities of searched contents, generates a search result page based on the selected contents, and provides the search result page to the user, or sorts the contents in the order from the highest reliability to the lowest reliability, generates a search result page based on the selected contents, and provides the search result page to the user in step S660, or the search result provider 34 may randomly arrange the searched contents and generate a search result page.

A title, part of contents, a writer, a posted date, and references may be displayed on the search result page, and a file attached status may be displayed by using an additional icon when an image file is attached in the corresponding contents, or the above-described generated reliabilities may be displayed for the respective contents. Therefore, the user may easily and selectively use the most reliable contents having the search word.

In the process for searching the sorting menus in the search stage shown in FIG. 5, the sorting menus for providing information on the search word are found and the reliability estimation is performed on the found sorting menus in a like manner of the unit and article search process. That is, the third searcher 313 is driven by control of the search controller 33 to find articles having information that corresponds to the input search word from among the articles stored in the contents databases 214 and 223 of the first and second community servers 21 and 22 and find sorting menus that post corresponding articles.

Next, the article estimation module 323a of the third reliability estimator 323 checks the number of articles posted on the found sorting menus based on the contents databases 214 and 223 and estimates reliabilities of respective sorting menus based on the checked number of articles, and the search result provider 34 displays the searched sorting menus to the user according to the reliabilities.

The method for generating the reliabilities of posted articles by using the representative value, the input value, and the reliability generation function in the above-described article search process may also be applied to the unit and sorting menu search process, which will not be described since a person skilled in the art can generate the reliabilities of communities and those of sorting menus by using the representative value, the input value, and the reliability generation function in the case of searching units based on the method shown in FIG. 7.

Another embodiment for performing a search process on search targets according to different search references and sorting search results with reliabilities will now be described.

In the embodiment, the searched units, articles, and sorting menus are not sorted and provided according to the order established by the system, but the system automatically modifies the order according to the features of the input search word, and arranged the search results.

Figure 8:
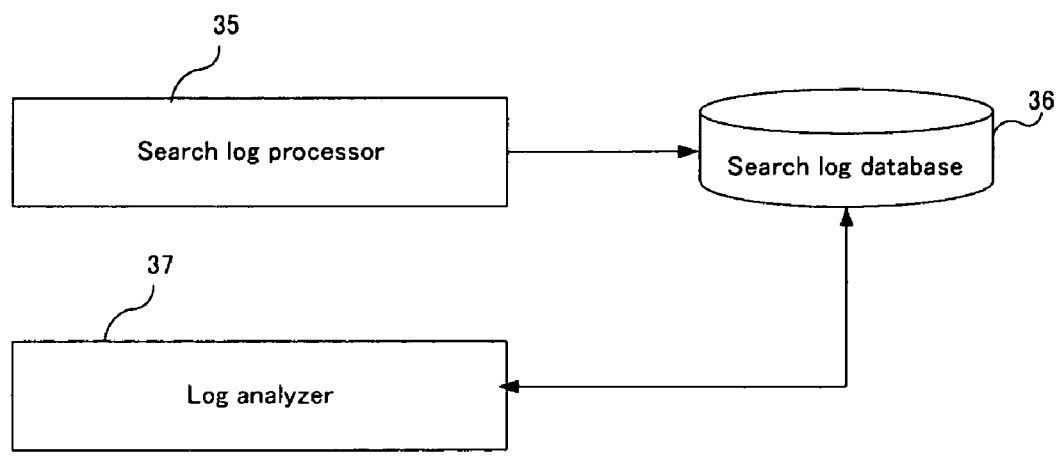
FIG. 8 shows a configuration diagram of a search system according to another embodiment of the present invention.

FIG. 8 shows a structure of an additional configuration of a search server according to another embodiment of the present invention.

As shown, the search server 30 includes a search log processor 35 for generating and recording users' search log information after provision of search results, and a search log database 36 for recording log information, and further includes a search log analyzer 37 for analyzing search targets selected the most by the users for respective search words based on log information stored in the search log database 36 and storing analysis results in correspondence to the search words.

The search log processor 35 analyzes what targets the users select on the search result page, and then records corresponding results, and in detail, the search log processor 35 checks the search result of which search target the user selects from among the search results for search targets such as the units, articles, and sorting menus provided on the search result page, matches the checked information with the input search word, and stores matched results in the search log database 36. Therefore, the search log database 36 records information on the search target selected in advance on the search result page by the user in correspondence to the search word, that is, search log information. For example, the search log database 36 records a search target "unit" selected corresponding to the search word of a "car" and additionally records a user ID who selected it.

After this, the search log analyzer 37 analyzes the search target selected the most by the user for each search word based on the users' search log information, and stores corresponding results in correspondence to the search word. Therefore, the search log database 36 stores search log analysis results corresponding to the search word. The search log analysis results represent the search targets for the search words selected the most by the users in a predetermined order, and for example, represent order information of units, articles, and sorting menus. The log analysis results may be varied depending on the search words.

Figure 9:
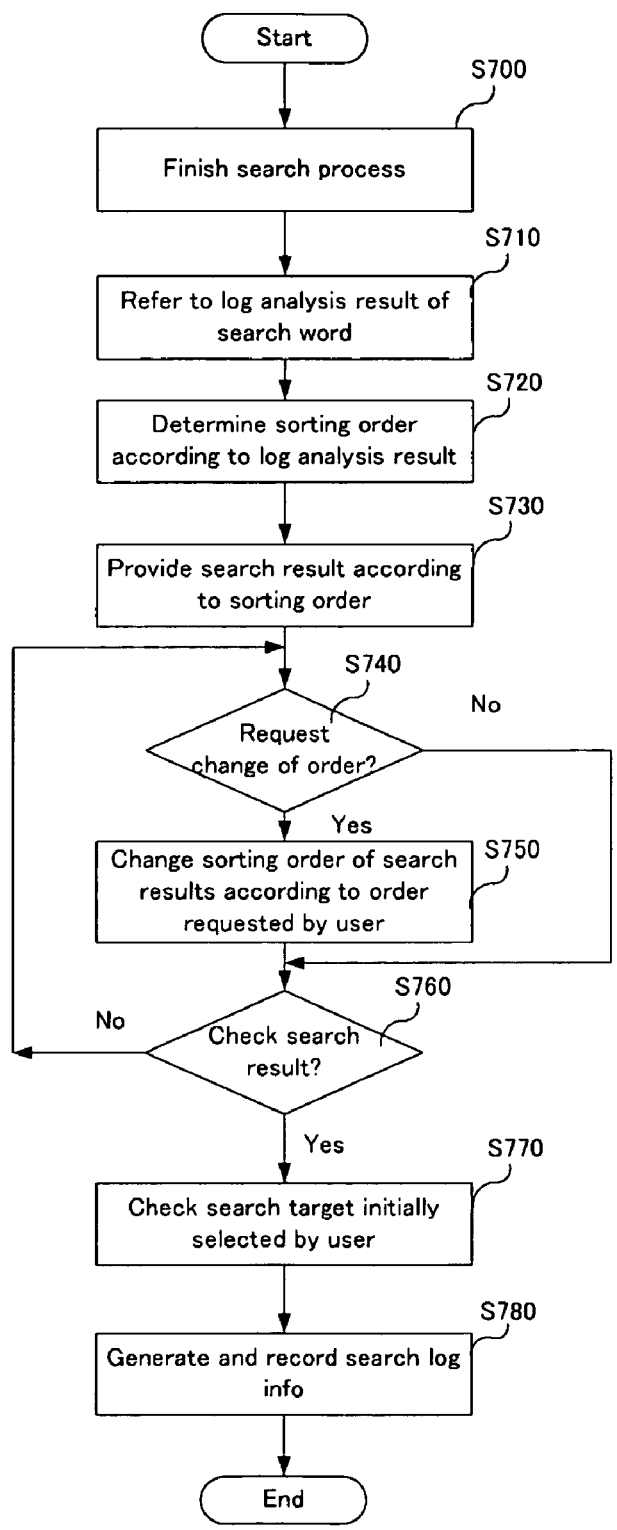
FIG. 9 shows a flowchart of a method for providing search results according to another embodiment of the present invention.

FIG. 9 shows a detailed search result providing method according to another embodiment of the present invention.

As described in the embodiment, when a search process is performed on the search targets according to different search references and reliabilities are assigned, the sorting order determination module 341 of the search result provider 34 searches the search log database 36 based on the input search word and refers to the log analysis results corresponding to the search word in steps S700 and S710.

The sorting order for providing search results according to the log analysis results is determined in step S720. For example, when it is given that the input search word is "car," the search process on the search word is performed, search results are provided to the users, the users select search targets and check search results of the search targets, and it is found that the largest search targets are units such as cafés or blogs, the second largest search targets are sorting menus, and the least search targets are articles, the log analysis result on this order is stored in the search log database 36. Therefore, the sorting order determination module 341 determines the sorting order in the sequence of the units, the sorting menus, and the articles according to the log analysis results, and provides the sorting order to the result providing module 342.

When the sorting order is determined, the result providing module 342 sorts the search targets in the order of units, sorting menus, and articles, and sorts the search results of the respective search targets according to the reliabilities estimated with different search references as described above, and generates a search result page in step S730.

The sorting order determination module 341 of the search result provider 34 provides order changeable menus so as to check search results in more various manners. When the user requests to change the order according to search results in step S740, the sorting order determination module 341 determines the sorting order according to the request, and the result providing module 342 resorts the search targets according to the sorting order selected by the user and provides the search results to the user. That is, when the user requests to change the order to the other order of articles, sorting menus, and units while the order is given as units, sorting menus, and articles, the search targets are displayed in the order of articles, 15 sorting menus, and units on the search result page, and search results for the respective search targets are sorted and provided according to the reliabilities in step S750.

The user can check the search results in the order of search targets that are generally checked on the search result page as the generated search result page is provided to the user.

When the user clicks to select a search result of a predetermined search target on the search result page provided as described above, the search log processor 35 checks the search target selected foremost by the user and stores corresponding log information in the search log database 36 in steps S760 to S780. For example, the search log processor 35 stores the initially checked search target corresponding to the search word, such as a unit, and additionally records a user ID.

The search log analyzer 37 performs a log analysis according to the recording process of search log information so that the users' intention of checking search results may be applied to the search process.

It is possible to generate search log information for each search word, analyze the search log information, and record a log analysis result, but this process has a large volume of data to be processed and search words are previously input so that the search words may not have been searched, and hence, it is possible to generate search log information for each search word category and analyze the same. For example, search words are classified by categories such as entertainment, lifestyle, culture, and politics (it is also possible to divide each category into a plurality of dependent categories), log information is recorded by finding search targets to be checked foremost by the users for respective categories, and the recorded log information is analyzed. A search word input in the subsequent search process is checked to which category the search word belongs, the sorting order is determined according to the log analysis result of the corresponding category, and the search result is provided to the user.

The search targets in the above-described embodiment includes units, articles, and sorting menus, and the same may include other data that can be searched on the network such as web documents, news, and images. The respective search targets may have different search references, and the search references may use at least one of predetermined estimation factors following the above-described first to third search references without being restricted to the above descriptions.

The above-described search method may be realized in a program format to be stored on a computer readable recording medium that includes any kinds of recording devices for storing computer readable data, for example, a CD-ROM, a magnetic tape, and a floppy disk, and may also be realized in a carrier wave format (e.g., Internet transmission).

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, more reliable information may be provided for the respective search targets since the search targets are searched with different search references.

Also, the user can more easily use more reliable contents since the search results are sorted according to reliabilities.

Further, the users can sort and check search results according to their intention since the sorting order of search results is changeable.

In addition, the users can easily know the search targets that provide more reliable information since the results of search targets are provided according to the order of search targets generally checked by the users according to the search word.

Therefore, the user can more conveniently receive reliable information.

What is claimed is:

1. A method that utilizes a processor to search for information about a search word provided by a user terminal in a system connected to a plurality of user terminals through a network, the method comprising:
   identifying search targets to be searched based on the search word that is provided by the user terminal through the network;
   performing a search process, using the processor, by applying different search criteria to the respective search targets; and
   providing search results for the respective search targets,
   wherein the search targets comprise at least one of the following: a unit configured to show a community on the network, an article configured to show contents posted in a community, and a sorting menu configured to indicate categories with different topics provided by a community,
   wherein the unit is searched based on a first search criteria that considers at least one of the following estimation factors: a community user reliability index, a community activity index, and a community volume,
   wherein the community user reliability index is indicative of a sum of reliability indexes of all users registered to corresponding communities, and each reliability index indicates a level of reliability of information the corresponding user provides,
   the community activity index is indicative of a level of activity with which the users registered to the corresponding community perform community activities, and is generated based on at least one of the following: number of contents posted within a predetermined time, number of users visiting the corresponding community, and number of other communities having predetermined relationships with the corresponding community, and
   the community volume is based on at least one of the following: number of users registered to the community and the number of contents posted in the community.

2. The method of claim 1, wherein the article search target is searched based on a second search reference that considers at least one of the following estimation factors: a user feature, contents usage, additional information attachment status of contents, and contents size.

3. The method of claim 1, wherein the sorting menu search target is searched based on a third search reference that considers the number of articles.

4. The method of claim 1, wherein the order of sorting search targets is changeable subsequent to the search results being provided for the respective targets.

5. The method of claim 4, wherein the order of sorting search targets is changed according to the search word input based on search results provided for the respective search targets.

6. The method of claim 5, wherein providing search results for respective search targets further comprises:
   checking the search target selected by the user after provision of search results;
   recording search log information for indicating the search target selected by the user in correspondence to the search word; and
   analyzing the search log information and determining the sorting order of the search targets according to the order of search targets initially selected by the users for the respective search words when the search results are provided.

7. The method of claim 4, wherein the order of sorting search targets is changed according to the user's selection of the respective search target and the respective search target's search result.

8. A method that utilizes a processor to search for information about a search word provided by a user terminal in a system connected to a plurality of user terminals through a network, the method comprising:
   identifying search targets to be searched based on the search word that is provided by the user terminal through the network;
   performing a search process, using the processor, by applying different search criteria to the respective search targets; and
   providing search results for the respective search targets,
   wherein the search targets comprise at least one of the following: a unit configured to show a community on the network, an article configured to show contents posted in a community, and a sorting menu configured to indicate categories with different topics provided by a community,
   wherein the article search target is searched based on a second search reference that considers at least one of the following estimation factors: a user feature, contents usage, additional information attachment status of contents, and contents size, wherein the user feature comprises at least one of age, job, sex, residence area, and user reliability index, the contents usage comprises at least one of number of replies corresponding to respective contents, number of comments, and number of mailing, and the additional information attachment status indicates a presence of at least one of an image, video, and audio attached to the contents.

9. The method of claim 8, wherein the sorting menu search target is searched based on a third search reference that considers the number of articles.

10. The method of claim 8, wherein the order of sorting search targets is changeable subsequent to the search results being provided for the respective targets.

11. The method of claim 10, wherein the order of sorting search targets is changed according to the search word input based on search results provided for the respective search targets.

12. The method of claim 11, wherein providing search results for respective search targets further comprises:

checking the search target selected by the user after provision of search results;

recording search log information for indicating the search target selected by the user in correspondence to the search word; and analyzing the search log information and determining the sorting order of the search targets according to the order of search targets initially selected by the users for the respective search words when the search results are provided.

13. The method of claim 10, wherein the order of sorting search targets is changed according to the user's selection of the respective search target and the respective search target's search result.

14. A method that utilizes a processor to search for information about a search word provided by a user terminal in a system connected to a plurality of user terminals through a network, the method comprising:

identifying search targets to be searched based on the search word that is provided by the user terminal through the network;

performing a search process, using the processor, by applying different search criteria to the respective search targets; and providing search results for the respective search targets, wherein the search targets comprise at least one of the following: a unit configured to show a community on the network, an article configured to show contents posted in a community, and a sorting menu configured to indicate categories with different topics provided by a community, wherein the article search target is searched based on a second search reference that considers at least one of the following estimation factors: a user feature, contents usage, additional information attachment status of contents, and contents size, wherein performing the search process comprises:

searching information having the search word for each search target; and generating reliability of information searched for the search target with a different search criterion, and providing search results comprises attaching a search result to the search target indicative of the reliability.

15. The method of claim 14, wherein the sorting menu search target is searched based on a third search reference that considers the number of articles.

16. The method of claim 14, wherein the order of sorting search targets is changeable subsequent to the search results being provided for the respective targets.

17. The method of claim 16, wherein the order of sorting search targets is changed according to the search word input based on search results provided for the respective search targets.

18. The method of claim 17, wherein providing search results for respective search targets further comprises:

checking the search target selected by the user after provision of search results;

recording search log information for indicating the search target selected by the user in correspondence to the search word; and analyzing the search log information and determining the sorting order of the search targets according to the order of search targets initially selected by the users for the respective search words when the search results are provided.

19. The method of claim 16, wherein the order of sorting search targets is changed according to the user's selection of the respective search target and the respective search target's search result.

* * * * *